United States Patent
Ohayon

[19]

[11] Patent Number: 5,564,653
[45] Date of Patent: Oct. 15, 1996

[54] HIGH PERFORMANCE ANTI-WEATHER PROTECTION SYSTEM FOR SPACE SHUTTLES AND LAUNCHING VEHICLES

[76] Inventor: Shalom Ohayon, 6618-20th Ave, Brooklyn, N.Y. 11204

[21] Appl. No.: 262,752

[22] Filed: Jun. 20, 1994

[51] Int. Cl.⁶ .................................................. B64G 5/00
[52] U.S. Cl. .................... 244/114 R; 52/69; 89/1.801; 244/63; 244/158 R; 244/116
[58] Field of Search .................... 244/114 R, 1 R, 244/158 R, 63, 115, 116; 52/64, 69, 71.72; 89/1.8, 1.84, 1.804, 1.815

[56] References Cited

U.S. PATENT DOCUMENTS

| | | | |
|---|---|---|---|
| 1,770,675 | 7/1930 | Short | 244/116 |
| 1,841,321 | 1/1932 | Arnstein | 244/114 R |
| 1,861,983 | 6/1932 | Short | 244/115 |
| 2,245,318 | 6/1941 | Blank | 52/64 |
| 4,738,057 | 4/1988 | Logan | 52/66 |
| 5,042,358 | 8/1991 | Kuriiwa | 89/1.8 |
| 5,189,851 | 3/1993 | Omika | 52/64 |
| 5,223,459 | 6/1993 | Odawara | 52/69 |

FOREIGN PATENT DOCUMENTS 742399  9/1966  Canada ........................... 52/69

*Primary Examiner*—Galen L. Barefoot

[57] ABSTRACT

The present invention related to a protection system for the shuttle and its crew, against whether associated material fatigue, due to pre launch whether conditions, especially to the joints connecting the shuttle to its boosters and the fuel tank, as well as the O-rings and heat sealers of the nozzles. At the same time, a high maneuverable semi-silo platform is used as fire escape-vehicle for the astronauts, in case a fire hazard is detected, and astronauts can evacuate the shuttle while count-down away from launch-pad for safety.

6 Claims, 11 Drawing Sheets

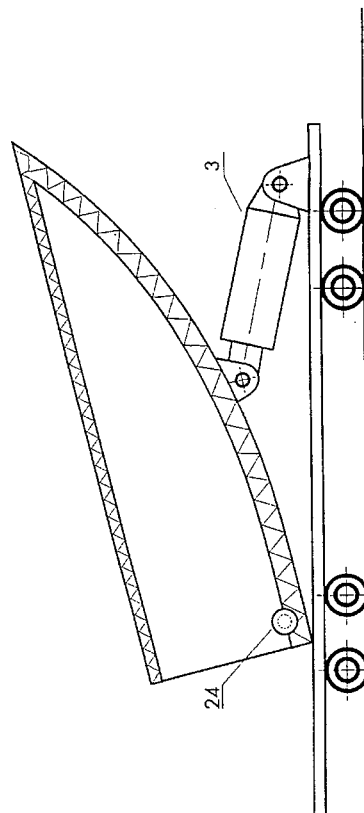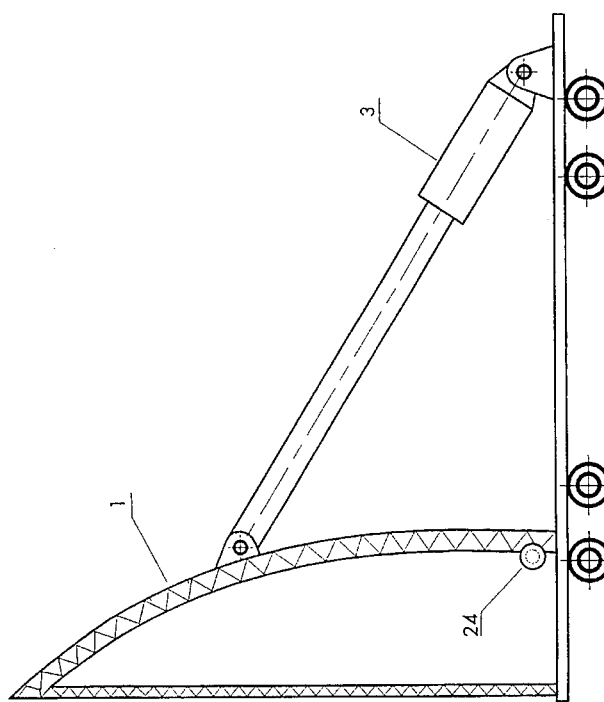
FIG. 9

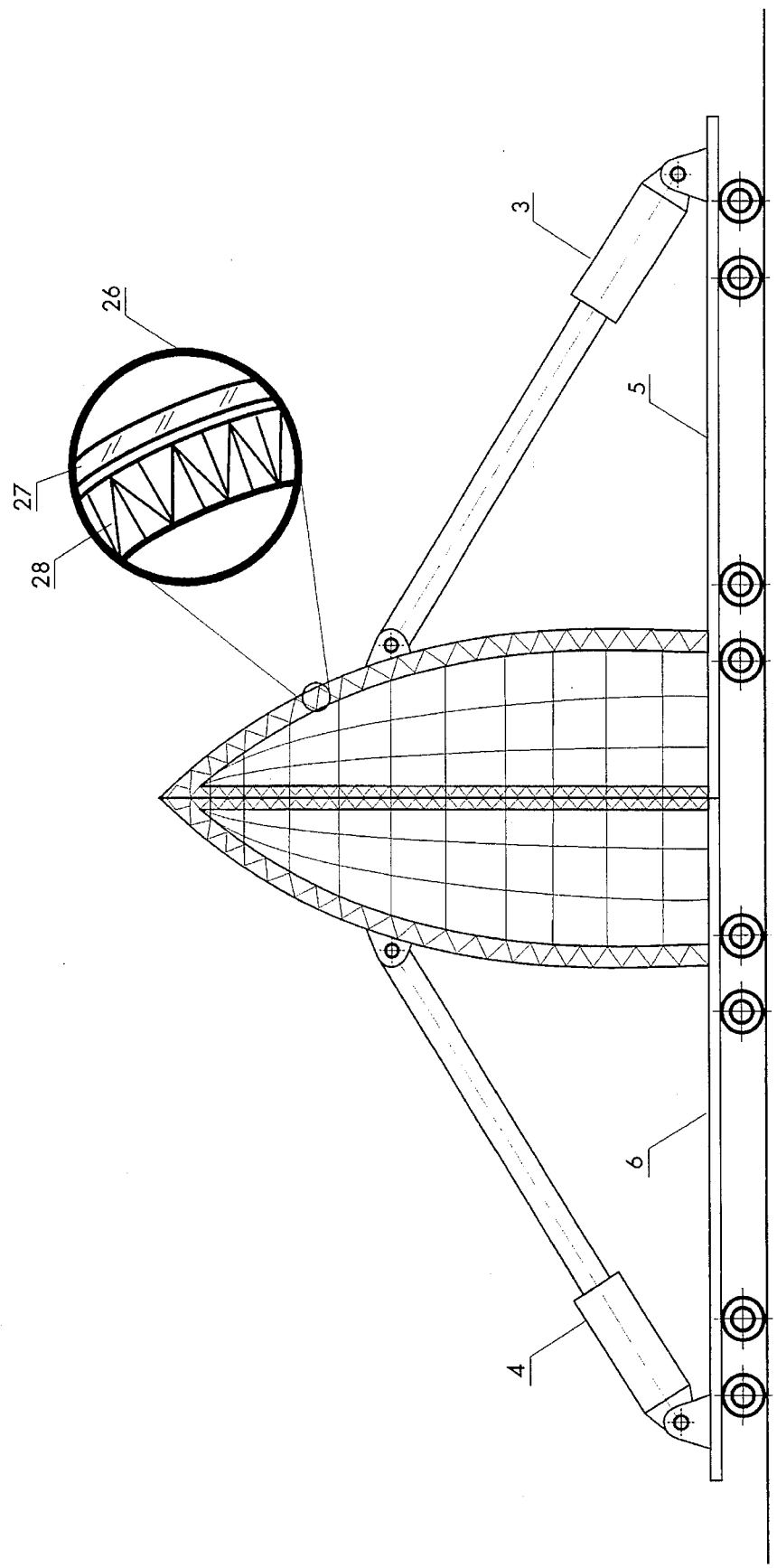
FIG:10

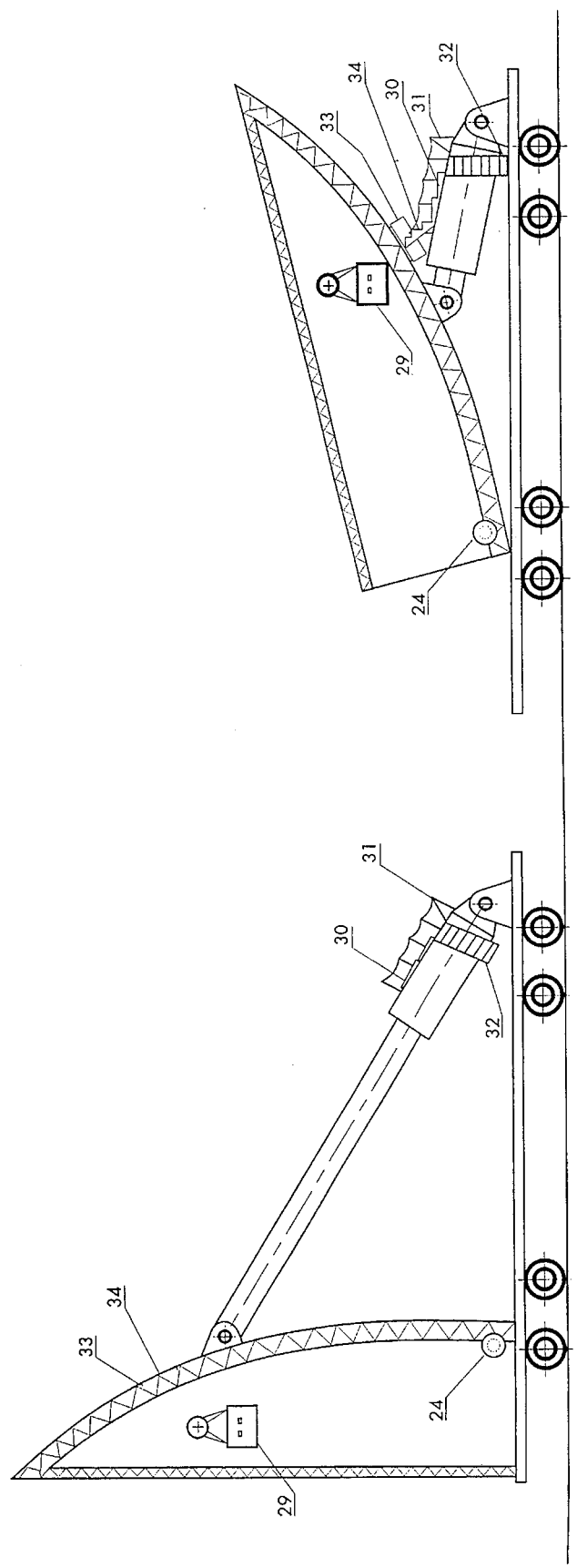
FIG:11

5,564,653

HIGH PERFORMANCE ANTI-WEATHER PROTECTION SYSTEM FOR SPACE SHUTTLES AND LAUNCHING VEHICLES

FIELD OF THE INVENTION

This invention relates to a high performance safety and accidents avoidance system in space program activity, a high-performance is the means for safe launch in any whether condition and at the same time, a half retractable silo, is to be used as a fire escape vehicle for the astronauts, when a fire broke up in the shuttle or within the launch-pad.

This whether proof system designed to ensure safe approach to liftoff and safe journey through a critical stage of crossing the earth atmosphere towards outer space, due to a climate and temperature control capabilities, there will be material failures control over components known as O-RINGS and JOINTS which malfunction in whether conditions as icing—condition, low temperatures and dynamic loads on the joints and other components fatigue.

BACKGROUND OF THE INVENTION

The space shuttle CHALLENGER accident draw a decline in the public support for the US space program for the lock of safer space program, spending huge amount of wealth and getting back so little benefits, is not justify the huge investments, the challenger accident stall the US space flights-program for tow years and the rocketed backup system fail to deliver space satellites due to rockets failures, the bottom line, is to improve safety on the ground and to achieve zero possibility of during-launch shuttle accidents is the key to a safe and successful space program and regaining profitable space activity by utilizing delivery system for communication satellites for other countries, this system is designed to reach that goal.

OVERVIEW OF THE INVENTION

This high performance safety space related invention, is capable of reducing pre launch material failure and at the same time it has the ability to rescue astronauts from the orbitter and launch-pad in case a fire or other risk is in progress.

The U.S. space—Shuttle system is based on three major elements which is known as: 1—A spacecraft or SHUTTLE, 2—S.R.Bs or thruster, 3—A fuel tank, this three elements are connected together with special Joints, and this special Joints are taking enormous dynamic loads during liftoff and climb-up, to stand all this the Joints has to be strong and at the same time flexible, this invention will reduce damage to the Joints and O-Rings by isolating the shuttle from winds, low-temperatures, and icing conditions and at the same time the temperature inside the silo will be controlled to a desired digit by a climate control system and thus low possibility of material failures during liftoff.

Furthermore:

According to the invention the integration of the system with the corent space program can be essential and without major changes within the system.

The Energy Impact on the National Level:

U.S decided to build up the space station and constantly fly crews to maintain research and development, the future of a space station has many importances, and the ground level preparations has its importance's as well, to maintain the space station and constant presence of sentrists and astronauts there will be need for intense flight schedule, taking in consideration emergencies there will be a constant shuttle on the launch-pad with a rotating crews in case there will be call for emergency liftoff, to be able to liftoff in any given time and any weather condition within the launch pad this invention will allow a safe flight to space in any given time.

The future vast commercialized space will be controlled by the country that will promise to supply, a reliable space routine flight—schedule, due to the global interest of installations of communication, navigation and research satellites, the U.S space program can reduce the huge budget spending, by selling space installations services to other countries, and at the same time increase employment hiring.

SUMMARY OF THE INVENTION

It is the object of the invention, to provide a means for safety and shuttle components fatigue avoidance due to pre launch weather conditions, to provide stable space flights patern, safe and reliable system towards future space program.

Anti Weather Protection System Comprising:

1. Two cimetric, half dome shaped greenhouse-silo, FIG. 1-1,2 FIG. 5-1,2, said two halves silo are amounted on a high maneuverability tracks FIG. 1-5,6.

Said two half silo domes will meet together with the koncaved shape-side to achieve complete sealed silo FIG. 5-1,2. FIG. 1-1,2.

2. Two halves of silo mounted on the tracks with a swivel Joints FIG. 6-20,21,22,23 thus will allow the koncaved half silo to rotate up to 90-degrees, FIG. 3-P-1 (position ONE) and retract to an aprox 35-degrees FIG. 3-2 (position two), half silo in a P-2 position to allow safe maneuvering through the launch complex wile low-profile is executed. FIG. 2-13 the half silo maneuvered while facing the direction of the wind like a ship-beak cutting the water and aerodynamic characteristics.

3. Construction materials and support elements as shown in FIG. 10 will consists galvanized alloys for whether and corrosion resistance, the frame of the structure will be covered with sun-rays transparent plates made of clear plastic substances to achieve greenhouse characteristics.

BRIEF DESCRIPTION OF THE DRAWINGS

The invention will now be described by way of example only, in the accompanying drawings in which:

FIG. 9—Is a side view of the invention with two way position, wherein the joints 24 on the base of the silo allows rotating between P-1 position and P-2 position.

FIG. 10—Is a view of the possibilities for construction elements to be adopted by silo structure, including zooming view of: construction for support-28, and clear plastic substances cover sheets 27, to allow sun rays to pass through the silo walls.

FIG. 11—Is a sectional view of the silo as a rescue-vehicle, wherein a fire proof cell 29 is mounted on a swivel joint to keep cell leveled all time and between two rotating positions of the half silo, the fire proof cell is mounted at the level of the shuttle astronauts cabin to allow quick evacuation of the shuttle and launch-pad by moving the silo track from P-1 position to P-2 position for safety, the astronauts will exit the cell and the silo by emergency exit-33 and retractable stairway 34, 30, 32.

DETAILED DESCRIPTION OF A PREFERRED EMBODIMENT

A preferred embodiment of the present invention will be explained in detail below with reference to the accompanying drawings.

Figure 5:
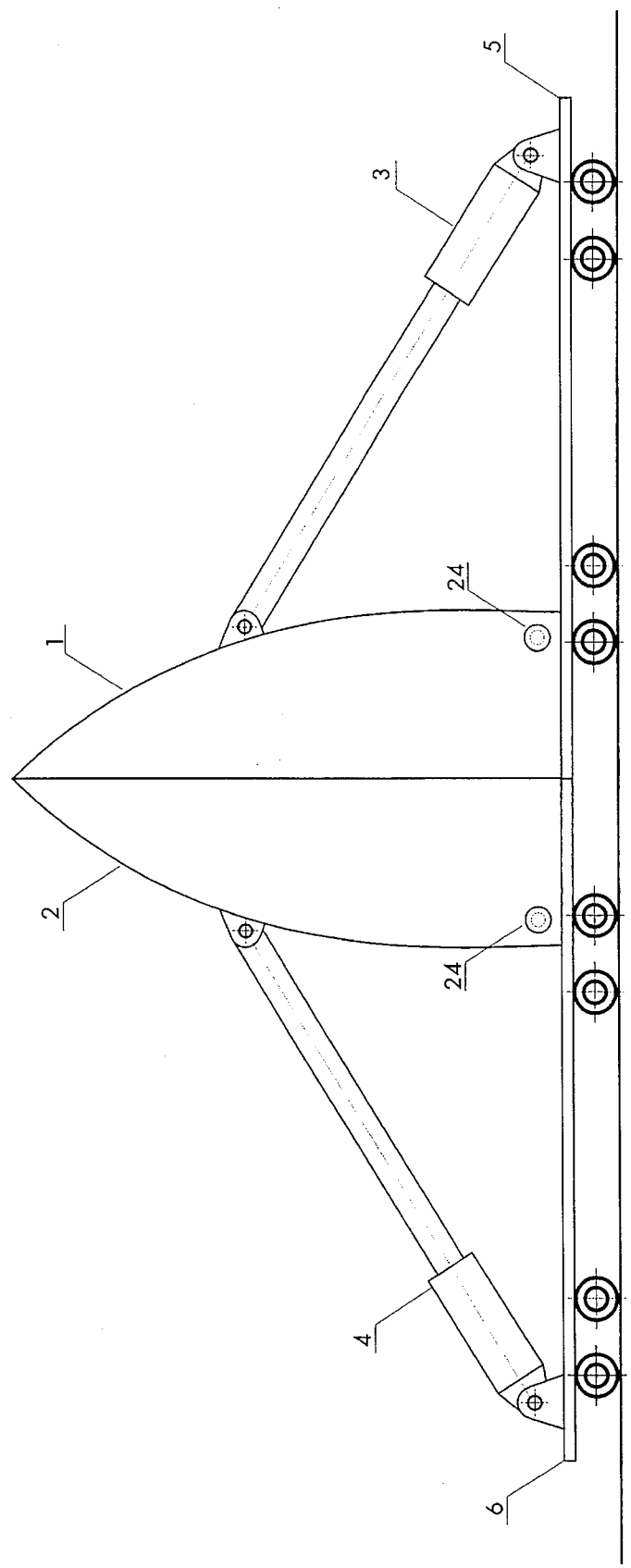
FIG. 5—The silo in a closing position view for self storage.
Figure 6:
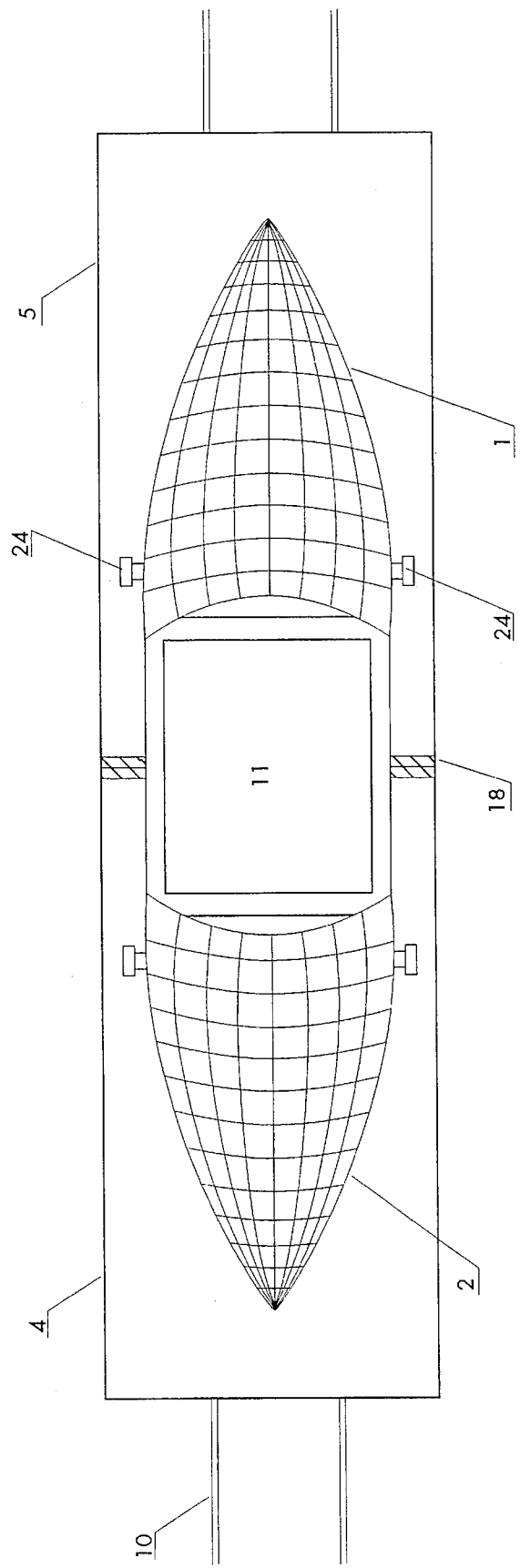
FIG. 6—Is a top-view of the two silo-tracks connected and retracted half silo, the two carrying tracks are not making contact with launch-pad.
Figure 7:
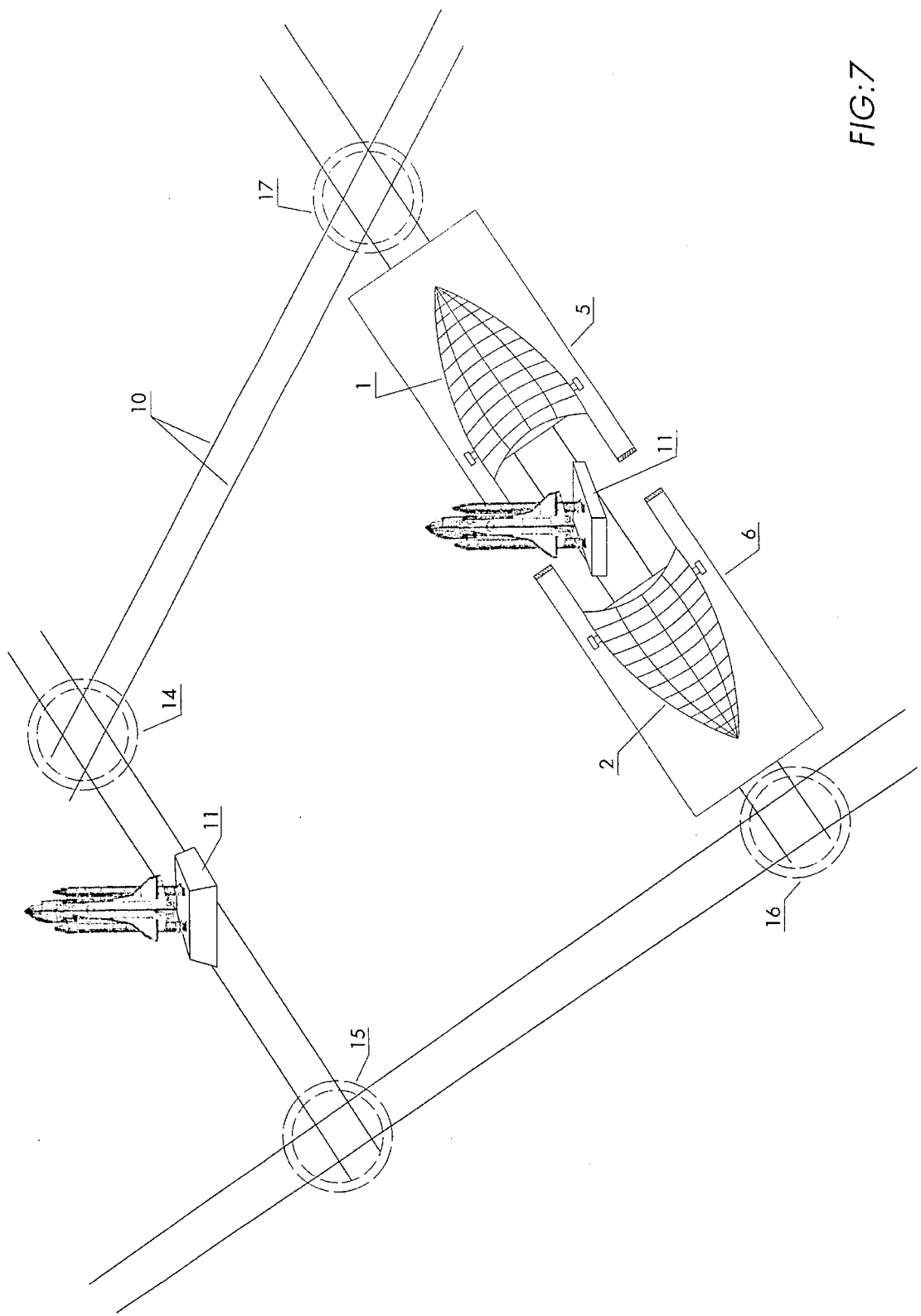
FIG. 7—A top view of the tracks maneuvering towards closing position over the launch-pad and shuttle.
Figure 8:
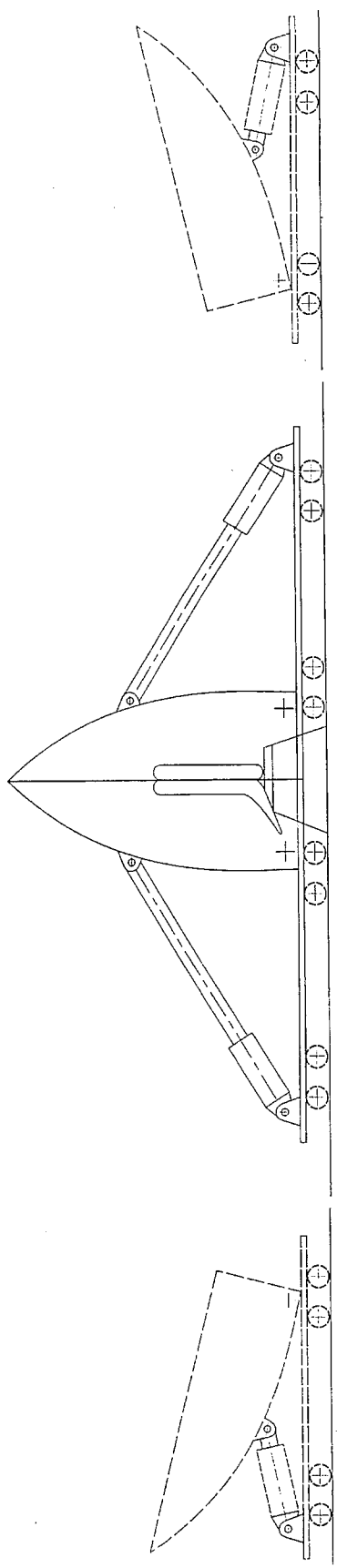
FIG. 8—a view of the concept drawing of the invention.

A high performance anti whether protection system for space shuttles according to the present invention comprises, FIG. 5 a dome-shape silo made of two identical and symetric halves of a complete silo 1,2 wherein each half silo is mounted on a high maneuverable track 5, 6 by connecting swivel joints 24, and a telescoping hydraulic arms 3,4 to achieve rotating position between upright 90-degrees for closing shuttle's-space and lower position for retractable 35-degrees to clear launch-pad area. One member of said telescoping hydraulic arm connected at the ¾ height of the half silo and the other lower member of the telescoping arm, is connected to the rear of the track for support and withstanding high wind 13. In addition the track with the half silo, in a retractable position can be maneuvered with a low profile to reduce wind resistance and risk of turnover.

In addition, a climate control unit based on each of the silo track, will be operated on a cold days and freezing temperature nights to maintain a room temperature within launch-pad and shuttle covered area. A rubber coating contact, on the arched contact area between two halves of the silo will provide cushion and sealing to ensure soft contact between two halves of silo.

Figure 1:
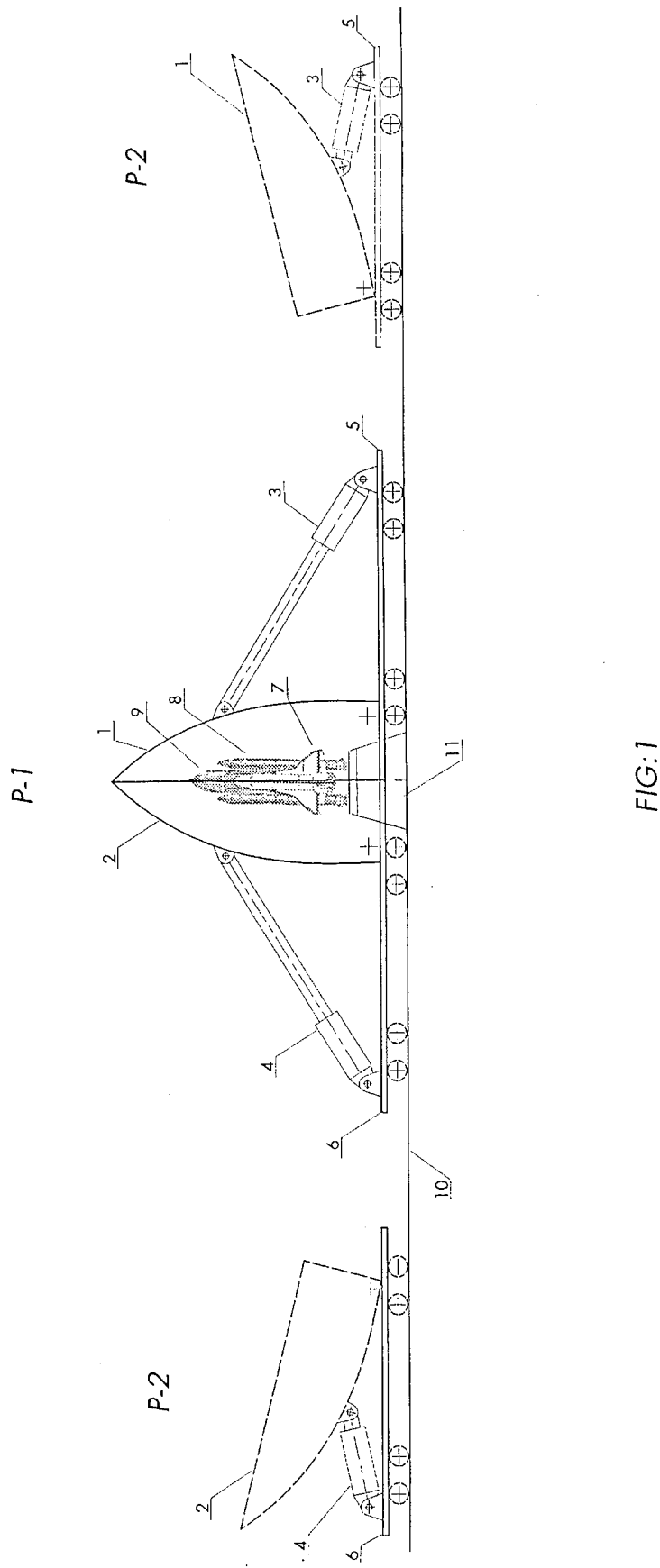
FIG. 1—A sectional view of a two way position of the invention which is a complete closing position of the shuttle ambient-space and a retracted position of the silo, where the two halves of the silo are separated and retracted to clear launch-pad for shuttle liftoff, P-1: Shuttle is sealed by the silo. P-2: Silo is retracted into a folding position for maneuvering to a storage, seconds before ignition of shuttle engines.
Figure 2:
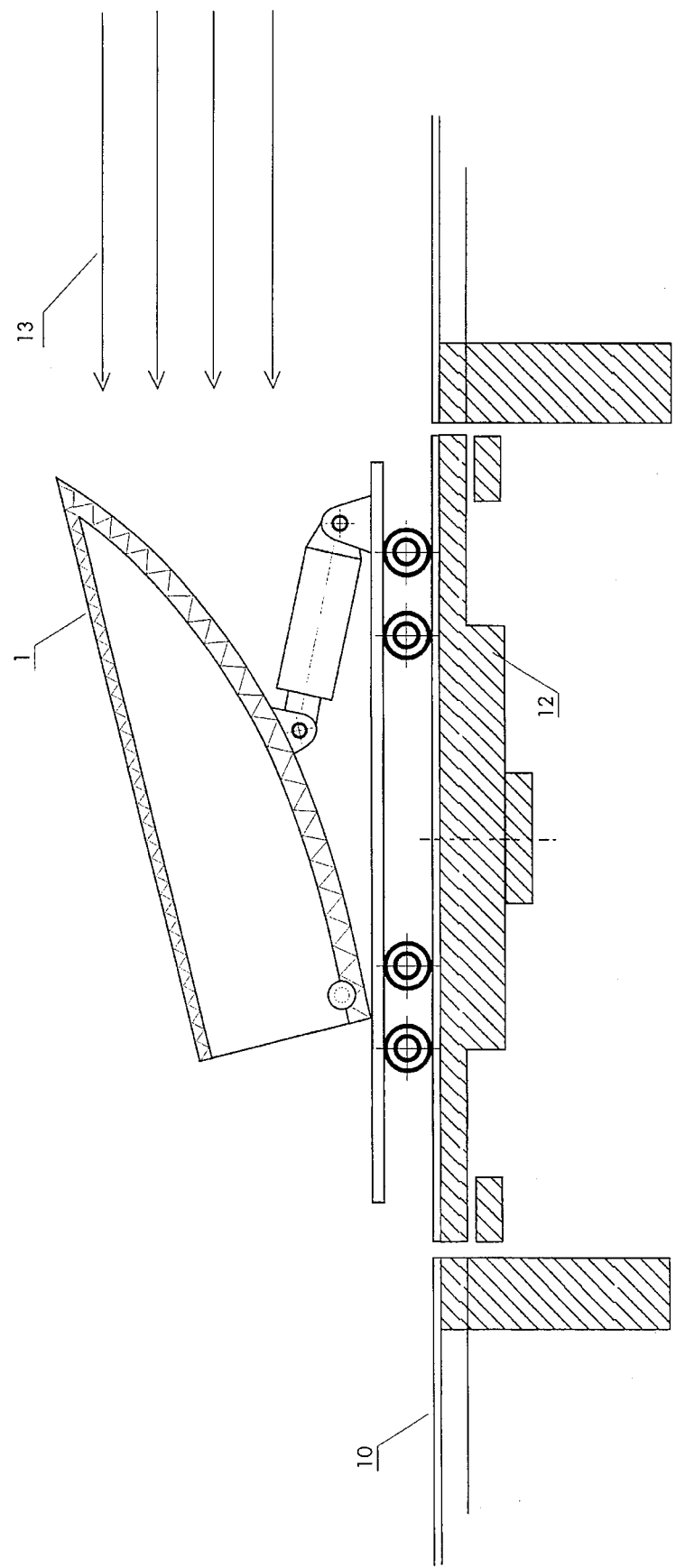
FIG. 2—A side view of the half silo on a turn-table and facing the wind direction with the conical side for efficient wind resistance, as offered by the invention.
Figure 3:
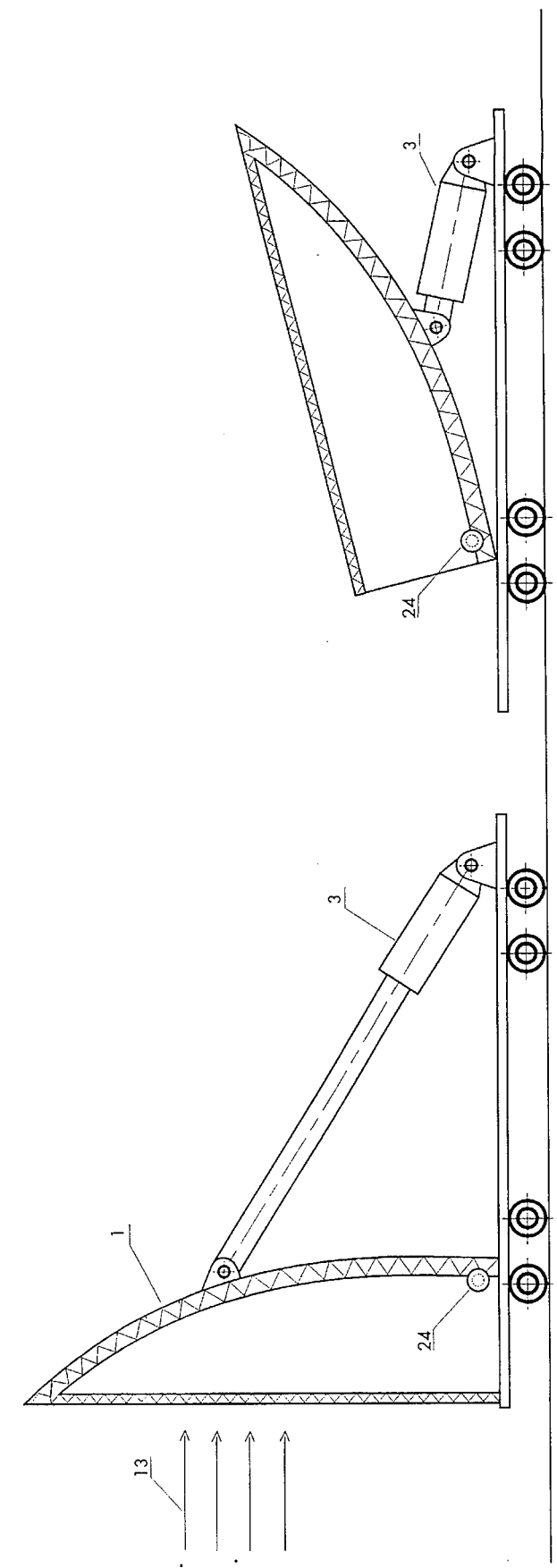
FIG. 3—A side view of a half silo, in a position P-1 with full extended hydraulic arm, in which the silo is in 90-degrees facing the wind with the conecaved side of the half-silo and supported with the extended arm, position P-2 is the retracted position.
Figure 4:
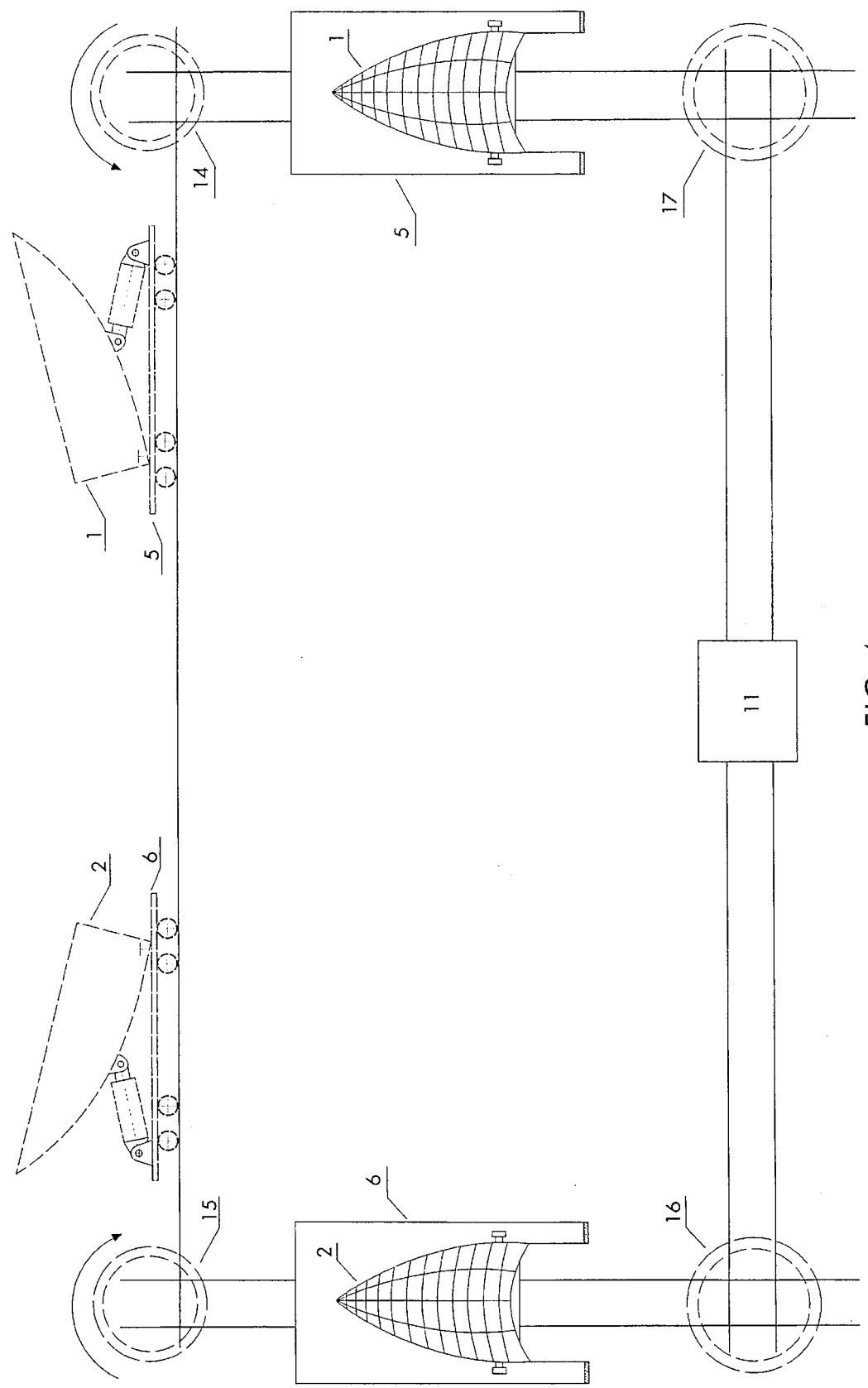
FIG. 4— Is an illustration of the launch-complex, with a variety of silo positions within the complex, using the turn-tables for changing locations.

The present invention operates as follows:

When space shuttle is mounted on launch-pad, the two tracks and each one carrying a half silo are moving towards the launch-pad, while the silo is folded in a P-2 or a low profile retracted position FIG. 3-P-2, when the tracks carrying the half silo is reaching a close distance within the launch-pad, the telescoping hydraulic arms are extended so the each half silo is raise and rotated into a 90-degrees upright position P-1, then the two tracks are moving towards each other till full contact between them is made FIG. 6-17,18 thus a full sealed silo is conducted FIG. 10, FIG. 5, FIG. 1-P-1 over the space shuttle, right when connection is completed, a utilized climate control mounted on the tracks can be activated to achieve desired temperature within the sealed space over launch-pad. The two half silos can be kept connected up to seconds before shuttle engines ignited on end of countdown, just before engines ignition each track starts moving about 180-degrees opposite to launch-pad to clear liftoff space and to escape nozzles backfire output,then the two half silos will meet again for self storage.

I claim:

1. A high performance anti-weather protection system for a spacecraft launch vehicle as it is positioned on a launch pad prior to launch comprising:

(a) two mobile symmetric vehicles each having a half shell pivotally mounted to its respective vehicle about a horizontal pivot axis;

(b) means for pivoting each half shell about its horizontal pivot axis on each mobile symmetric vehicle;

(c) means for moving each mobile symmetric vehicle in opposite directions away from each other; and (d) said half shells being sized such that when said mobile symmetric vehicles are positioned adjacent to each other and the half shells are pivoted to a closed position they form an enclosed shell that completely encloses and protects the spacecraft launch vehicle on its launch pad from the environment and when said shells are pivoted to an open position and the mobile symmetric vehicles are moved apart the spacecraft launch vehicle is free to be launched.

2. A high performance anti-weather protection system as set forth in claim 1, wherein said half shells have a light weight metal frame that supports said half shell in a concave shape.

3. A high performance anti-weather protection system as set forth in claim 1, wherein said half shells are provided with a transparent cover to permit sunlight to enter the closed half shells and naturally heat the interior thereof.

4. A high performance anti-weather protection system as set forth in claim 1, wherein said mobile symmetric vehicles are mounted on tracks to enable them to moved away from the launch pad.

5. A high performance anti-weather protection system as set forth in claim 1, wherein one of said half shells includes a heat resistant capsule pivotally connected to the interior of said one half shell and positioned adjacent to a crew compartment of said spacecraft launch vehicle to provide for a safe escape capsule for the crew should an emergency evacuation be required prior to launch of the spacecraft launch vehicle.

6. A high performance anti-weather protection system as set forth in claim 1, wherein said half shells are provided with a climate control and air conditioning system for maintaining the temperature and climate of the interior of said half shells when said spacecraft launch vehicle is positioned therein.

\* \* \* \* \*